(12) United States Patent
Lim et al.

(10) Patent No.: US 8,119,726 B2
(45) Date of Patent: *Feb. 21, 2012

(54) FLAME RETARDANT THERMOPLASTIC RESIN COMPOSITION

(75) Inventors: Jong Cheol Lim, Annyang-si (KR); Tae Gon Kang, Suwon-si (KR); Hyuk Jin Jung, Gunpo-si (KR)

(73) Assignee: Cheil Industries Inc., Gumi-si (KR)

( * ) Notice: Subject to any disclaimer, the term of this patent is extended or adjusted under 35 U.S.C. 154(b) by 157 days.

This patent is subject to a terminal disclaimer.

(21) Appl. No.: 11/576,172

(22) PCT Filed: Dec. 27, 2004

(86) PCT No.: PCT/KR2004/003457
§ 371 (c)(1),
(2), (4) Date: Mar. 28, 2007

(87) PCT Pub. No.: WO2006/041237
PCT Pub. Date: Apr. 20, 2006

(65) Prior Publication Data
US 2007/0295946 A1    Dec. 27, 2007

(30) Foreign Application Priority Data
Oct. 13, 2004    (KR) .................. 10-2004-0081620

(51) Int. Cl.
*C08K 5/00* (2006.01)
(52) U.S. Cl. .......... 524/515; 524/146; 524/147; 524/96; 252/607; 252/609; 252/601
(58) Field of Classification Search .................. 252/607, 252/601, 609; 524/97, 95, 96
See application file for complete search history.

(56) References Cited

U.S. PATENT DOCUMENTS

| | | | |
|---|---|---|---|
| 3,322,853 A * | 5/1967 | Trementozzi et al. .......... 525/65 |
| 3,839,513 A | 10/1974 | Patel | |
| 4,062,909 A | 12/1977 | Morgan et al. | |
| 4,102,853 A | 7/1978 | Kawamura et al. | |
| 4,117,041 A | 9/1978 | Guschl | |
| 4,391,935 A | 7/1983 | Bialous et al. | |
| 4,632,946 A | 12/1986 | Muench et al. | |
| 4,692,488 A | 9/1987 | Kress et al. | |
| 4,883,835 A | 11/1989 | Buysch et al. | |
| 4,914,144 A | 4/1990 | Muehlbach et al. | |
| 4,918,159 A | 4/1990 | Nakamura et al. | |
| 4,983,658 A | 1/1991 | Kress et al. | |
| 4,988,748 A | 1/1991 | Fuhr et al. | |
| 5,061,745 A | 10/1991 | Wittmann et al. | |
| 5,204,394 A * | 4/1993 | Gosens et al. .................. 524/125 |
| 5,206,404 A | 4/1993 | Gunkel et al. | |
| 5,218,030 A | 6/1993 | Katayose et al. | |
| 5,219,907 A | 6/1993 | Niessner et al. | |
| 5,605,962 A | 2/1997 | Suzuki et al. | |
| 5,627,228 A * | 5/1997 | Kobayashi ..................... 524/127 |
| 5,643,981 A | 7/1997 | Yang et al. | |
| 5,672,645 A | 9/1997 | Eckel et al. | |
| 5,731,390 A | 3/1998 | van Helmond et al. | |
| 5,750,602 A | 5/1998 | Kohler et al. | |
| 5,833,886 A * | 11/1998 | Dashevsky et al. ........... 252/601 |
| 5,905,122 A | 5/1999 | Ohtsuka et al. | |
| 5,955,184 A | 9/1999 | Honda et al. | |
| 6,022,917 A * | 2/2000 | Kobayashi ..................... 524/127 |
| 6,083,428 A * | 7/2000 | Ueda et al. ..................... 252/609 |
| 6,127,465 A * | 10/2000 | Nodera .......................... 524/125 |
| 6,174,945 B1 | 1/2001 | Kim et al. | |
| 6,369,141 B1 * | 4/2002 | Ishii et al. ...................... 524/127 |
| 6,437,029 B1 | 8/2002 | Lim et al. | |
| 6,528,559 B1 | 3/2003 | Nakacho et al. | |
| 6,528,561 B1 | 3/2003 | Zobel et al. | |
| 6,566,428 B1 * | 5/2003 | Eckel et al. .................... 524/127 |
| 6,576,161 B2 | 6/2003 | Lim et al. | |
| 6,596,794 B1 * | 7/2003 | Eckel et al. .................... 524/123 |
| 6,596,893 B2 | 7/2003 | Nakacho et al. | |
| 6,613,822 B1 | 9/2003 | Eckel et al. | |

(Continued)

FOREIGN PATENT DOCUMENTS

| | | |
|---|---|---|
| CA | 1 121 535 | 4/1982 |
| DE | 196 32 675 A1 | 2/1998 |
| DE | 19801198 A1 | 7/1999 |
| DE | 10061081 A1 | 6/2002 |
| EP | 0149813 | 7/1985 |
| EP | 0 449 689 A1 | 10/1991 |
| EP | 0 612 806 A1 | 8/1994 |
| EP | 0640655 A3 | 3/1995 |
| EP | 0 661 342 A1 | 7/1995 |
| EP | 0 700 968 A1 | 3/1996 |

(Continued)

OTHER PUBLICATIONS

International Search Report dated Jul. 14, 2005, in international publication No. PCT/KR2004/003457.

(Continued)

*Primary Examiner* — Mark Eashoo
*Assistant Examiner* — Jane L Stanley
(74) *Attorney, Agent, or Firm* — Summa, Additon & Ashe, P.A.

(57) ABSTRACT

The flame retardant thermoplastic resin composition according to the present invention comprises (A) about 45 to 95 parts by weight of a polycarbonate resin; (B) about 1 to 50 parts by weight of a rubber modified vinyl graft copolymer; (C) about 0 to 50 parts by weight of a vinyl copolymer; (D) about 1 to 30 parts by weight of a mixture of oligomeric phosphoric acid ester compounds consisting of ($d_1$) about 5 to 99% by weight of an oligomeric phosphoric acid ester compound derived from bisphenol-A and ($d_2$) about 1 to 95% by weight of an oligomeric phosphoric acid ester compound derived from resorcinol, per 100 parts by weight of the sum of (A), (B) and (C); and (E) about 0.05~5 parts by weight of a fluorinated polyolefin resin, per 100 parts by weight of the sum of (A), (B) and (C).

11 Claims, No Drawings

U.S. PATENT DOCUMENTS

| | | | |
|---|---|---|---|
| 6,613,824 B2 | 9/2003 | Campbell et al. | |
| 6,630,524 B1 | 10/2003 | Lim et al. | |
| 6,686,404 B1 | 2/2004 | Eckel et al. | |
| 6,716,900 B2 | 4/2004 | Jang et al. | |
| 6,762,228 B2 | 7/2004 | Seidel et al. | |
| 6,890,979 B2 | 5/2005 | Eichenauer et al. | |
| 6,914,089 B2 | 7/2005 | Eckel et al. | |
| 6,956,072 B1 * | 10/2005 | Kanaka et al. | 524/115 |
| 7,001,944 B2 | 2/2006 | Vathauer et al. | |
| 7,094,818 B2 | 8/2006 | Lim et al. | |
| 7,511,088 B2 | 3/2009 | Lim et al. | |
| 7,550,523 B2 | 6/2009 | Lim et al. | |
| 7,659,332 B2 | 2/2010 | Kang et al. | |
| 2001/0009946 A1 | 7/2001 | Catsman et al. | |
| 2002/0115759 A1 | 8/2002 | Eckel et al. | |
| 2003/0139504 A1 | 7/2003 | Miebach et al. | |
| 2004/0122139 A1 | 6/2004 | Yang et al. | |
| 2004/0192814 A1 | 9/2004 | Yang et al. | |
| 2004/0198877 A1 | 10/2004 | Yang et al. | |
| 2004/0249027 A1 | 12/2004 | Lim et al. | |
| 2004/0249070 A1 | 12/2004 | Lim et al. | |
| 2005/0245648 A1 | 11/2005 | Lim et al. | |
| 2006/0014863 A1 * | 1/2006 | Lim et al. | 524/115 |
| 2007/0155873 A1 * | 7/2007 | Kang et al. | 524/115 |
| 2007/0249767 A1 | 10/2007 | Kang et al. | |
| 2007/0249768 A1 * | 10/2007 | Hong et al. | 524/123 |
| 2007/0295946 A1 | 12/2007 | Lim et al. | |
| 2008/0182926 A1 | 7/2008 | Lim et al. | |

FOREIGN PATENT DOCUMENTS

| | | |
|---|---|---|
| EP | 0 728 811 A2 | 8/1996 |
| EP | 0 767 204 A2 | 4/1997 |
| EP | 0771852 A2 | 5/1997 |
| EP | 0 795 570 A1 | 9/1997 |
| EP | 0909790 A1 | 4/1999 |
| EP | 0 970 997 A2 | 1/2000 |
| EP | 1 069 156 A1 | 1/2001 |
| EP | 1069154 A | 1/2001 |
| EP | 1209163 A1 | 5/2002 |
| JP | 59-149912 A1 | 8/1984 |
| JP | 59-202240 | 11/1984 |
| JP | 61 00785 | 1/1994 |
| JP | 06-100785 | 4/1994 |
| JP | 7-76649 | 3/1995 |
| JP | 08-012868 A | 1/1996 |
| JP | 8-208884 | 8/1996 |
| JP | 09-053009 | 2/1997 |
| JP | 2000-154277 A1 | 6/2000 |
| JP | 2001-316580 A | 11/2001 |
| KR | 1994-0014647 | 7/1994 |
| KR | 1996-14253 A | 5/1996 |
| KR | 1999-33150 A | 5/1999 |
| KR | 1999-47019 A1 | 7/1999 |
| KR | 2000 41992 A1 | 1/2000 |
| KR | 1020000009218 A | 2/2000 |
| KR | 1020000041993 A | 7/2000 |
| KR | 10-2000-0055347 A | 9/2000 |
| KR | 2001 109044 A1 | 12/2001 |
| KR | 2002 6350 A1 | 1/2002 |
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| WO | 99 19383 A1 | 4/1999 |
| WO | 99/57198 A1 | 11/1999 |
| WO | 00/18844 A1 | 4/2000 |
| WO | 00 00544 A1 | 1/2001 |
| WO | 01/06634 A1 | 9/2001 |
| WO | 00 09518 A1 | 2/2002 |
| WO | 02 46287 A1 | 6/2002 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006 041237 A1 | 4/2006 |

OTHER PUBLICATIONS

International Preliminary Report on Patentability dated Jan. 25, 2007, in international publication No. PCT/KR2004/003457.
European Search Report for Counterpart Application No. EP 04808586, completed on Sep. 25, 2007.
International Search Report in commonly owned International Application No. PCT/KR2006/005752, dated Mar. 27, 2007.
Search Report in European Patent Application No. EP 01 27 4302 dated Mar. 4, 2005.
Office Action in commonly owned U.S. Appl. No. 11/768,592 mailed Apr. 8, 2009.
Notice of Allowance in commonly owned U.S. Appl. No. 11/647,101 mailed Dec. 29, 2008.

* cited by examiner

FLAME RETARDANT THERMOPLASTIC RESIN COMPOSITION

CROSS REFERENCE TO RELATED APPLICATIONS

This application claims priority from PCT Application No. PCT/KR2004/003457, filed Dec. 27, 2004, pending, which designates the U.S. and which is hereby incorporated by reference in its entirety, and from Korean Patent Application No. 10-2004-0081620, filed Oct. 13, 2004, pending, which is also hereby incorporated in its entirety.

FIELD OF THE INVENTION

The present invention relates to a flame retardant polycarbonate thermoplastic resin composition with good flame retardancy. More particularly, the present invention relates to a flame retardant thermoplastic resin composition having good flame retardancy, heat resistance, and mechanical strength, impact resistance, thermal stability, processability, and appearance, which comprises a polycarbonate resin, a rubber modified vinyl graft copolymer, a vinyl copolymer, a mixture of oligomeric phosphoric acid ester compounds, and a fluorinated polyolefin resin.

BACKGROUND OF THE INVENTION

A blend of a polycarbonate resin and a styrene-containing copolymer is a well-known resin composition with improved processability maintaining the good notched impact strength. This blend resin composition should further have good flame retardancy as well as high mechanical strength because the resin composition are applied to electric or electronic goods, automobile parts, office supplies, etc.

To provide the polycarbonate resin with good flame retardancy, a halogen-containing flame retardant and/or an antimony-containing compound were used. However, the halogen-containing compound is fatally harmful due to the toxic gases generated during combustion, and therefore nowadays the halogen-free resin compositions are used widely.

As a method for conferring flame-retardancy without using a halogen-based flame retardant, a method using a phosphate ester-based flame retardant is commonly used. U.S. Pat. No. 4,692,488 discloses a thermoplastic resin composition comprising a halogen free aromatic polycarbonate resin, a halogen free SAN (styrene-acrylonitrile) copolymer, halogen free phosphorus compounds as flame retardants, a tetrafluoroethylene polymer and a small amount of ABS (acrylonitrile-butadiene-styrene) copolymer.

U.S. Pat. No. 5,061,745 discloses a thermoplastic resin composition comprising an aromatic polycarbonate resin, an ABS graft copolymer, a copolymer, and a monophosphorous ester. However, the resin composition using the monomeric phosphoric acid ester compound as a flame retardant has very poor heat resistance and shows, so called, "juicing phenomenon" which occurs during molding process because the flame retardant form the laminate on the surface of molding product due to the volatility.

It is known that an oligomeric phosphate is used as a flame retardant. Japanese Patent Publication No. 59-202,240 discloses a method of preparing an oligomeric phosphate and the use of the oligomeric phosphate in a polyamide or polycarbonate resin composition.

In addition, U.S. Pat. No. 5,204,394 discloses a resin composition comprising an aromatic polycarbonate resin, a styrene-containing copolymer or a graft copolymer, and oligomeric phosphate as flame retardants. Although the resin composition improves the juicing phenomenon and heat resistance, but is inferior to the resin composition using the monophosphorous esters as flame retardants in flame retardancy. Accordingly, to maintain a good flame retardancy, the resin composition should contain more flame retardants than in the resin composition containing monophosphorous ester as flame retardants. As a result, the resin composition shows poor mechanical properties due to the high content of a flame retardant.

EP 0 640 655 describes a PC/ABS resin composition containing an aromatic polycarbonate, a vinyl copolymer, a graft copolymer, a combination of a monophosphorus compound and an oligomeric phosphorus compound as flame retardants, and a fluorinated polyolefin. In this case, the resin composition shows juicing phenomenon due to the monophosphorous compound, and deterioration of heat stability. Further the flame retardation ability of the resin composition is lowered due to the oligomeric phosphate ester.

The present inventors have developed a flame retardant thermoplastic resin composition that comprises a polycarbonate resin, a rubber modified vinyl-grafted copolymer, a vinyl copolymer, a mixture of oligomeric phosphoric acid ester compounds as a flame retardant and a fluorinated polyolefin resin, which has a good balance of physical properties such as flame retardant, heat resistance, mechanical strength, impact resistance, heat stability, processability and appearance.

OBJECTS OF THE INVENTION

An object of the present invention is to provide a thermoplastic resin composition with good flame retardancy.

Another object of the present invention is to provide a thermoplastic resin composition with good heat resistance.

A further object of the present invention is to provide a thermoplastic resin composition with good mechanical properties.

A further object of the present invention is to provide a thermoplastic resin composition with a good balance of physical properties such as impact strength, heat stability, processability and appearance.

Other objects and advantages of this invention will be apparent from the ensuing disclosure and appended claims.

SUMMARY OF THE INVENTION

A flame retardant thermoplastic resin composition according to the present invention comprises (A) about 45 to 95 parts by weight of a polycarbonate resin; (B) about 1 to 50 parts by weight of a rubber modified vinyl graft copolymer prepared by graft-polymerizing ($b_1$) about 5 to 95% by weight of a monomer mixture consisting of 40 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and 5 to 60% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture there of onto ($b_2$) about 5 to 95% by weight of a rubber polymer selected from the group consisting of butadiene rubber, acryl rubber, ethylene-propylene rubber, styrene-butadiene rubber, acrylonitrile-butadiene rubber, isoprene rubber, copolymer of ethylene-propylene-diene (EPDM), polyorganosiloxane-polyalkyl (meth)acrylate rubber complex and a mixture thereof, ; (C) about 0 to 50 parts by weight of a vinyl copolymer prepared by copolymerizing ($c_1$) about 50 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and ($c_2$) about 5 to 50% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture thereof; (D) about 1 to 30 parts by weight of a mixture of oligomeric phosphoric acid ester compounds consisting of ($d_1$) about 5 to 99% by weight of an oligomeric phosphoric acid ester compound derived from bisphenol-A and ($d_2$) about 1 to 95% by weight of an oligomeric phosphoric acid ester compound derived from resorcinol, per 100 parts by weight of the sum of (A), (B) and (C); and (E) about 0.05~5 parts by weight of a fluorinated polyolefin resin, per 100 parts by weight of the sum of (A), (B) and (C).

DETAILED DESCRIPTION OF THE INVENTION (A) Polycarbonate Resin

The polycarbonate resin can be prepared by reacting a diphenol represented by the following formula (I) with a phosgene, a halogen formate or a carboxylic acid diester:

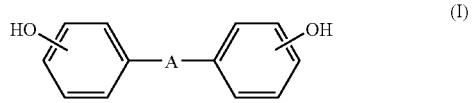

(I)

wherein A is a single bond, a $C_{1-5}$ alkylene group, a $C_{1-5}$ alkylidene group, a $C_{5-6}$ cycloalkylidene group, S or $SO_2$.

The examples of the diphenol include hydroquinone, resorcinol, 4,4'-dihydroxydiphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane. More preferable diphenols are 2,2-bis-(4-hydroxyphenyl)-propane, 2,2-bis-(3,5-dichloro-4-hydroxyphenyl)-propane, and 1,1-bis-(4-hydroxyphenyl)-cyclohexane, and most preferable diphenol is 2,2-bis-(4-hydroxyphenyl)-propane called 'bisphenol A'.

In the present invention, it is preferable that the polycarbonate resin (A) has a weight average molecular weight ($M_w$) of about 10,000 to 200,000, more preferably about 15,000 to 80,000.

Suitable polycarbonates incorporated into the composition of the present invention may be branched in a known manner, in particular preferably by incorporation 0.05 to 2 mol %, based to total quantity of diphenols used, of tri- or higher functional compounds, for example, those with three or more phenolic groups.

A homopolymer of polycarbonate, a copolymer of polycarbonate or a mixture thereof may be used in this invention. Some portion of the polycarbonate resin may be replaced with an aromatic polyester-carbonate resin that is obtained by polymerization in the presence of an ester precursor, such as difunctional carboxylic acid.

In the present invention, the polycarbonate resin is used in an amount of about 45 to 95 parts by weight as a base resin.
(B) Rubber Modified Vinyl Graft Copolymer Resin The rubber modified vinyl graft copolymer according to the present invention is prepared by graft copolymerizing ($b_1$) 5 to 95% by weight of a monomer mixture consisting of 40 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and 5 to 60% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture there of onto ($b_2$) 5 to 95% by weight of a rubber polymer selected from the group consisting of butadiene rubber, acryl rubber, ethylene-propylene rubber, styrene-butadiene rubber, acrylonitrile-butadiene rubber, isoprene rubber, copolymer of ethylene-propylene-diene (EPDM), polyorganosiloxane-polyalkyl (meth)acrylate rubber complex and a mixture thereof.

The $C_{1-8}$ methacrylic acid alkyl ester or the $C_{1-8}$ acrylic alkyl ester is ester of methacrylic acid or acrylic acid respectively with monohydric alcohol with 1 to 8 carbon atoms. The examples of the acid alkyl ester include methacrylic acid methyl ester, methacrylic acid ethyl ester, acrylic acid ethyl ester, acrylic acid methyl ester, or methacrylic acid propyl ester. Methacrylic acid methyl ester is the most preferable.

Preferable examples of the rubber modified vinyl graft copolymer (B) are grafted-copolymers obtained by graft polymerizing a mixture of styrene, acrylonitrile, and optionally (meth)acrylic acid alkyl ester onto butadiene rubber, acryl rubber, or styrene-butadiene rubber.

Another preferable examples of the rubber modified vinyl graft copolymer (B) are grafted-copolymers obtained by graft polymerizing (meth)acrylic acid alkyl ester onto butadiene rubber, acryl rubber, or styrene-butadiene rubber.

The most preferable examples of the rubber modified vinyl-grafted copolymer are a grafted-polymer that a mixture of styrene and acrylonitrile is grafted onto butadiene rubber, which is called acrylonitrile-butadiene-styrene (ABS) resin, and a grafted-polymer of MBS resin.

The rubber polymer to prepare the rubber modified vinyl graft copolymer has preferably an average particle size of about 0.05 to 4 μm considering the impact strength and appearance.

The rubber modified graft copolymer according to the present invention can be prepared through a conventional polymerization process such as emulsion, suspension, solution, or bulk process. Among these processes, preferable is the emulsion or bulk polymerization in which said vinyl monomers are added to the rubber polymer using an initiator.

The rubber modified vinyl graft copolymer is used in an amount of about 1 to 50 parts by weight.
(C) Vinyl Copolymer Resin The vinyl copolymer of the present invention is a vinyl copolymer or a mixture of thereof that is prepared by copolymerizing ($c_1$) 50 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and ($c_2$) 5 to 50% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture thereof.

The $C_{1-8}$ methacrylic acid alkyl ester or $C_{1-8}$ acrylic acid alkyl ester is ester of methacrylic acid or acrylic acid respectively with monohydric alcohol with 1 to 8 carbon atoms. The examples of the acid alkyl ester include methacrylic acid methyl ester, methacrylic acid ethyl ester, acrylic acid ethyl ester, acrylic acid methyl ester, or methacrylic acid propyl ester. Methacrylic acid methyl ester is the most preferable.

The vinyl copolymer (C) can be produced as by-products when preparing the rubber modified vinyl-grafted copolymer (B). The by-products are mostly produced when a large quantity of monomers are grafted onto a small amount of rubber polymer or when a chain transfer agent is used in excess. The amount of the vinyl copolymer (C) to be used in this invention does not include the amount of the by-products that might be produced during preparation of the rubber modified vinyl-grafted copolymer (B).

The preferable examples of the vinyl copolymer (C) are those prepared from monomer mixture of styrene, acrylonitrile, and optionally methacrylic acid methyl ester; monomer mixture of α-methyl styrene, acrylonitrile, and optionally methacrylic acid methyl ester; or monomer mixture of styrene, α-methyl styrene acrylonitrile, and optionally methacrylic acid methyl ester.

The vinyl copolymer is preferably prepared by emulsion, suspension, solution, or bulk process, and has a preferable weight average molecular weight ($M_w$) of about 15,000 to 300,000.

Another preferable examples of the vinyl copolymer (C) are those prepared from a mixture of methacrylic acid methyl ester monomers and optionally acrylic acid methyl ester monomers or acrylic acid ethyl ester monomers. The methacrylic acid methyl ester copolymer of the present invention is preferably prepared by emulsion, suspension, solution or bulk process, and has a weight average molecular weight ($M_w$) of about 20,000 to 250,000.

Another preferred copolymers (C) to be incorporated into the composition of the invention are random copolymers styrene and maleic acid anhydride, which is prepared by a continuous bulk process and a solution process. The maleic acid anhydride is preferably used in the amount of about 5 to 50% by weight. The copolymer of styrene and maleic acid anhydride has a weight average molecular weight ($M_w$) of about 20,000 to 200,000 and an intrinsic viscosity of about 0.3 to 0.9.

The styrene for preparation of the component (C) in this invention can be replaced by p-methylstyrene, vinyltoluene, 2,4-dimethylstyrene, or α-methylstyrene.

The vinyl copolymer (C) is used in single or in combination as a mixture and used in an amount of about 0 to 50 parts by weight, preferably about 0.1 to 40.

(D) Oligomeric Phosphoric Acid Ester Compound ($d_1$) Bisphenol A-Derived Oligomeric Phosphoric Acid Ester Compound The oligomeric phosphoric acid ester compound derived from bisphenol A ($d_1$) of the present invention is represented as following Formula (II). The bisphenol A-derived oligomeric phosphoric acid ester compound may be used in single or in combination as a mixture.

$$R_1-O-\overset{\overset{O}{\|}}{\underset{\underset{R_1}{|}}{\underset{|}{P}}}-O-\left[\begin{array}{c}\\ \end{array}\phantom{x}\overset{CH_3}{\underset{CH_3}{\underset{|}{\overset{|}{C}}}}\phantom{x}\begin{array}{c}\\ \end{array}-O-\overset{\overset{O}{\|}}{\underset{\underset{R_1}{|}}{\underset{|}{P}}}-O\right]_m R_1 \quad (II)$$

wherein $R_1$ is $C_{6-20}$ aryl group or an alkyl-substituted $C_{6-20}$ aryl group, and m is an integer representing the number of repeating units of 1 to 5. The average value of m in the mixture of the bisphenol A-derived oligomeric phosphoric acid ester is 1 to 3.

Preferable $R_1$ is a phenyl group, a naphthalene group, an alkyl-substituted phenyl group, or an alkyl-substituted naphthalene group where alkyl is methyl, ethyl, propyl, isopropyl, butyl, sec-butyl, t-butyl, isobutyl, isoamyl or t-amyl. Among them, phenyl group, naphthalene group, and alkyl-substituted phenyl group in which alkyl is methyl, ethyl, isopropyl and t-butyl are preferred.

The oligomeric phosphoric acid ester compound of formula (II) of the present invention is derived from bisphenol A and has an average value of m of 1 to 3. The bisphenol A-derived oligomeric phosphate having m value of 1, 2, and 3 can be used alone or a mixture thereof, which is prepared in the course of polymerization, or which is formulated with independent phosphates having the different m values.

($d_2$) Resorcinol-Derived Oligomeric Phosphoric Acid Ester Compound

The oligomeric phosphoric acid ester compound derived from resorcinol ($d_2$) of the present invention is represented as following Formula (III). The resorcinol-derived oligomeric phosphoric acid ester compound may be used in single or in combination as a mixture.

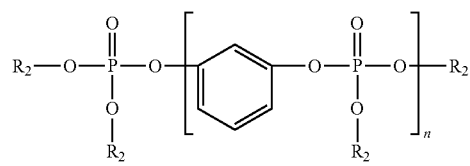

wherein $R_2$ is $C_{6-20}$ aryl group or an alkyl-substituted $C_{6-20}$ aryl group, and n is an integer representing the number of repeating units of 1 to 5. The average value of n in the mixture of the resorcinol-derived oligomeric phosphoric acid ester is 1 to 3.

Preferable $R_2$ is a phenyl group, a naphthalene group, an alkyl-substituted phenyl group, or an alkyl-substituted naphthalene group where alkyl is methyl, ethyl, propyl, isopropyl, butyl, sec-butyl, t-butyl, isobutyl, isoamyl or t-amyl. Among them, phenyl group, naphthalene group, and alkyl-substituted phenyl group in which alkyl is methyl, ethyl, isopropyl and t-butyl are preferred.

The oligomeric phosphoric acid ester compound of formula (III) of the present invention is derived from resorcinol and has an average value of n of 1 to 3. The resorcinol-derived oligomeric phosphate having n value of 1, 2, and 3 can be used alone or a mixture thereof, which is prepared in the course of polymerization, or which is formulated with independent phosphates having the different n values.

The oligomeric phosphoric acid ester compound (D) comprises the bisphenol A-derived oligomeric phosphoric acid ester compound ($d_1$) of formula (II) or a mixture thereof and the resorcinol-derived oligomeric phosphoric acid ester compound ($d_2$) of formula (III) or a mixture thereof.

Preferably, the oligomeric phosphoric acid ester compound (D) comprises about 5 to 99% by weight of the bisphenol A-derived oligomeric phosphoric acid ester compound ($d_1$) and about 1 to 95% by weight of the resorcinol-derived oligomeric phosphoric acid ester compound ($d_2$). More preferably, the oligomeric phosphoric acid ester compound (D) comprises about 10 to 95% by weight of the bisphenol A-derived oligomeric phosphoric acid ester compound ($d_1$) and about 5 to 90% by weight of the resorcinol-derived oligomeric phosphoric acid ester compound ($d_2$).

The oligomeric phosphoric acid ester compound (D) is used in an amount of about 1 to 30 parts by weight as per 100 parts by weight of (A)+(B)+(C) of the flame retardant thermoplastic resin composition according to the present invention.

(E) Fluorinated Polyolefin Resin

The examples of the fluorinated polyolefin resin of the present invention are polytetrafluoroethylene, polyvinylidenefluoride, tetrafluoroethylene/vinylidenefluoride copolymer, tetrafluoroethylene/hexafluoropropylene copolymer, and ethylene/tetrafluoroethylene copolymer. The fluorinated polyolefin resin may be used in single or in combination as a mixture.

The fluorinated polyolefin resin functions to form a fibrillar network when the resin composition containing the fluorinated polyolefin resin is extruded, resulting to increase the flow viscosity and to increase the shrinkage during combustion so as to prevent the dripping phenomena.

The fluorinated polyolefin resin (E) according to the present invention is prepared by a conventional process, for example, the resin is prepared in an aqueous solvent at 7 to 71 kg/cm$^2$ and 0 to 200° C., preferably 20~100° C., in the presence of a free radical forming catalyst such as sodium-, potassium-, or ammonium-peroxydisulphate.

The fluorinated polyolefin resin is used in emulsion state or in powder state. In case using in emulsion state, dispersion of the fluorinated polyolefin resin is good, but the process will be somewhat complicated. Accordingly, if the fluorinated polyolefin resin could be uniformly dispersed in the entire resin composition to form the fibrillar network structure, it is preferable to use the fluorinated polyolefin resin in powder state.

The fluorinated polyolefin resin has preferably average particle size of about 0.05 to 1,000 μm and density of about 1.2 to 2.3 g/cm$^3$.

The fluorinated polyolefin resin is used in an amount of about 0.05 to 5 parts by weight as per 100 parts by weight of (A)+(B)+(C) of the flame retardant thermoplastic resin composition according to the present invention.

The flame retardant resin composition of the present invention may further contain conventional flame retardant such as an organic phosphoric acid ester, a phosphazene compound, a cyanurate compound, a metal salt, and etc.

The examples of the organic phosphoric acid ester are triphenyl phosphate, diphenylnaphthalene phosphate, trixylene phosphate and so on.

The metal salt such as sulfonic acid metal salt and perfluoro alkane sulfonic acid metal salt may be used as a flame retardant aid. The metal salt may be used in single or in combination as a mixture.

Other additives may be contained in the resin composition of the present invention. The additives include flame retardant aids, lubricants, releasing agents, nucleating agent, antistatic agents, stabilizers, impact modifiers, inorganic fillers, pigments or dyes and the likes. The additives are employed in an amount of 0 to 60 parts by weight, preferably 1 to 40 parts by weight, as per 100 parts by weight of (A)+(B)+(C) of the flame retardant thermoplastic resin composition.

The flame retardant thermoplastic resin composition according to the present invention can be prepared by a conventional method. All the components and additives are mixed together and extruded through an extruder and are prepared in the form of pellets.

The flame retardant thermoplastic resin composition according to the present invention can be applied to housing of electric or electronic goods such as computer housing, etc which require good flame retardancy and high impact strength.

The present invention may be better understood by reference to the following examples that are intended for the purpose of illustration and are not to be construed as in any way limiting the scope of the present invention, which is defined in the claims appended hereto. In the following examples, all parts and percentage are by weight unless otherwise indicated.

EXAMPLES (A) Polycarbonate Resin
Bisphenol-A based polycarbonate with a weight average molecular weight (M$_w$) of about 25,000 was used.
(B) Rubber Modified Vinyl-Grafted Copolymer
(B1) 58 parts of butadiene rubber latex, 29 parts of styrene, 13 parts of acrylonitrile, and 150 parts of deionized water were mixed. To the mixture, 1.0 parts of potassium oleate, 0.4 parts of cumenhydroperoxide, and 0.3 parts of t-dodecyl mercaptane chain transfer agent were added. The mixture was kept at 75° C. for 5 hours to obtain ABS latex. To the ABS latex, 1% sulfuric acid was added, coagulated and dried to obtain styrene-containing graft copolymer resin (g-ABS) in powder form.

(B2) A graft copolymer of C223A (product name) by MRC Dupont company was used, in which methacrylic acid methyl ester monomers are grafted onto butadiene rubber.
(C) Vinyl Copolymer
72 parts of styrene, 28 parts of acrylonitrile, 120 parts of deionized water and 0.3 parts of azobisisobutylonitrile (AIBN) were mixed. To the mixture, 0.5 parts of tricalciumphosphate and 0.2 parts of t-dodecyl mercaptan chain transfer agent were added. The resultant solution was suspension polymerized at 75° C. for 5 hours. The resultant was washed, dehydrated and dried. Styrene-acrylonitrile copolymer (SAN) in powder state was used.
(D) Oligomeric Phosphoric Acid Ester Compound
(d$_1$) Bisphenol A-Derived Oligomeric Phosphoric Acid Ester Compound The bisphenol-A derived oligomeric phosphoric acid ester represented by the chemical Formula (II) is used, where R$_1$ is a phenyl group, which consists of 3.4% by weight of the compound of m=0, 85.4% by weight of the compound of m=1, and 11.1% by weight of the compound of m=2, and which has an average of m=1.08. The phosphoric acid ester is manufactured by Daihachi Co. of Japan as CR-741 (product name).

(d$_2$) Resorcinol-Derived Oligomeric Phosphoric Acid Ester Compound

The resorcinol derived oligomeric phosphoric acid ester represented by the chemical Formula (III) where R$_2$ is a methyl-substituted phenyl group is used, which is manufactured by Daihachi Co. of Japan as PX-200 (product name).
(E) Fluorinated Polyolefin Resin
Teflon (registered trademark) 7AJ by Dupont company was used.

Examples 1~4

The components as shown in Table 1, an antioxidant and a heat stabilizer were added in a conventional mixer and the mixture was extruded through a twin screw extruder with L/D=35 and Φ=45 mm to prepare a product in pellet form. The resin pellets were molded into test specimens for measuring flame retardancy and other properties using a 10 oz injection molding machine at 240~280° C. The specimens were kept at the relative humidity of 50% at 23° C. for 48 hours. The physical properties were measured in accordance with ASTM regulations.

Comparative Examples 1~4

Comparative Example 1 was conducted in the same manner as in Example 1 except that the amount of the oligomeric phosphoric acid ester compound derived from bisphenol-A (d$_1$) was increased, and no oligomeric phosphoric acid ester compound derived from resorcinol (d$_2$) was used.

Comparative Example 2 was conducted in the same manner as in Example 1 except that the amount of the oligomeric phosphoric acid ester compound derived from resorcinol (d$_2$) was increased, and no oligomeric phosphoric acid ester compound derived from bisphenol-A (d$_1$) was used.

Comparative Example 3 was conducted in the same manner as in Example 3 except that only an oligomeric phosphoric acid ester compound derived from bisphenol-A (d$_1$) was used as a flame retardant and no vinyl copolymer (c) was used.

Comparative Example 4 was conducted in the same manner as in Example 3 except that only an oligomeric phosphoric acid ester compound derived from resorcinol ($d_2$) was used as a flame retardant and no vinyl copolymer (c) was used.

TABLE 1

|  |  | Examples |  |  |  | Comparative Examples |  |  |  |
|---|---|---|---|---|---|---|---|---|---|
|  |  | 1 | 2 | 3 | 4 | 1 | 2 | 3 | 4 |
| (A) Polycarbonate Resin |  | 82 | 82 | 97 | 97 | 82 | 82 | 97 | 97 |
| (B) Rubber Modified | (B1) | 10 | 10 | — | — | 10 | 10 | — | — |
| Vinyl-Grafted Copolymer | (B2) | — | — | 3 | 3 | — | — | 3 | 3 |
| (C) Vinyl Copolymer |  | 8 | 8 | — | — | 8 | 8 | — | — |
| (D) oligomeric phosphoric | ($d_1$) | 14 | 13 | 4 | 1.5 | 17 | — | 6 | — |
| acid ester compound | ($d_2$) | 1 | 2 | 1 | 3.5 | — | 17 | — | 6 |
| (E) Fluorinated Polyolefin Resin |  | 0.5 | 0.5 | 0.5 | 0.5 | 0.5 | 0.5 | 0.5 | 0.5 |

The physical properties of the test specimens of Examples 1~4 and Comparative Examples 1~4 were measured as follow:

(1) Flame Retardancy

The flame retardancy was measured in accordance with UL94. The test specimens have a thickness of 1.6 mm.

(2) Total Flame Out Time

For each Example, five specimens were tested twice. The total flame out time is the sum of the first flame out time and the second flame out time.

(3) notch Izod impact strength

The notch Izod impact strength was measured in accordance with ASTM D256(1/8" notched).

(4) Vicat Softening Temperature (VST)

The Vicat Softening Temperature was measured in accordance with ASTM D1525.

The test results were shown in Table 2 below.

TABLE 2

|  | Examples |  |  |  | Comparative Examples |  |  |  |
|---|---|---|---|---|---|---|---|---|
|  | 1 | 2 | 3 | 4 | 1 | 2 | 3 | 4 |
| UL 94 (1.6 mm) | V-0 | V-0 | V-0 | V-0 | V-2 | V-1 | V-1 | V-1 |
| Total Flame Out Time (sec) | 22 | 19 | 25 | 18 | — | 57 | 65 | 58 |
| Izod impact strength (1/8", kg·cm/cm) | 55 | 54 | 85 | 88 | 45 | 41 | 75 | 72 |
| VST (° C.) | 103 | 103 | 130 | 129 | 99 | 100 | 127 | 128 |

As shown in Table 2, the resin compositions according to the present invention employing a mixture of the oligomeric phosphoric acid ester compounds show high impact strength as well as good flame retardancy and good heat resistance, compared to those employing a single oligomeric phosphoric acid ester compound in a higher amount.

The present invention can be easily carried out by an ordinary skilled person in the art. Many modifications and changes may be deemed to be with the scope of the present invention as defined in the following claims.

What is claimed is:

1. A flame retardant thermoplastic resin composition comprising:

(A) about 45 to 95 parts by weight of a thermoplastic polycarbonate resin;

(B) about 1 to 50 parts by weight of a rubber modified vinyl graft copolymer prepared by graft-polymerizing ($b_1$) about 5 to 95% by weight of a monomer mixture consisting of 40 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and 5 to 60% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture there of onto ($b_2$) about 5 to 95% by weight of a rubber polymer selected from the group consisting of butadiene rubber, acryl rubber, ethylene-propylene rubber, styrene-butadiene rubber, acrylonitrile-butadiene rubber, isoprene rubber, copolymer of ethylene-propylene-diene (EPDM), polyorganosiloxane-polyalkyl (meth) acrylate rubber complex and a mixture thereof;

(C) about 0 to 50 parts by weight of a vinyl copolymer prepared by copolymerizing ($c_1$) about 50 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and ($c_2$) about 5 to 50% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture thereof;

(D) about 1 to 30 parts by weight of a mixture of oligomeric phosphoric acid ester compounds consisting of ($d_1$) about 5 to 99% by weight of an oligomeric phosphoric acid ester compound derived from bisphenol-A represented by the following Formula (II) or a mixture thereof:

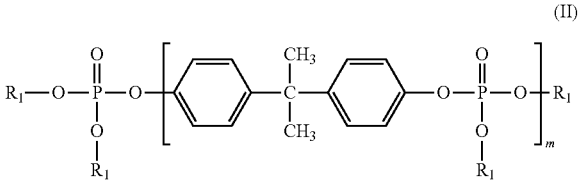

(II)

wherein each $R_1$ is unsubstituted $C_{6-20}$ aryl, m is an integer representing the number of repeating units of 1 to 5, and the average value of m in the mixture of the bisphenol A-derived oligomeric phosphoric acid ester is 1 to 3; and ($d_2$) about 1 to 95% by weight of an oligomeric phosphoric acid ester compound, derived from resorcinol represented by the following Formula (III) or a mixture thereof, per 100 parts by weight of the sum of (A), (B) and (C):

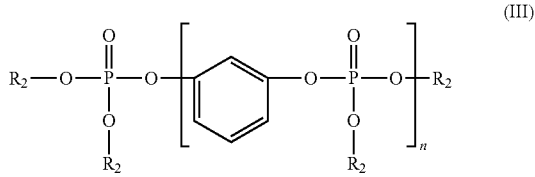

wherein $R_2$ is independently $C_{6-20}$ aryl group or an alkyl-substituted $C_{6-20}$ aryl group, n is an integer representing the number of repeating units of 1 to 5, and the average value of n in the mixture of the resorcinol-derived oligomeric phosphoric acid ester is 1 to 3; and (E) about 0.05 to 5 parts by weight of a fluorinated polyolefin resin, per 100 parts by weight of (A)+(B)+(C).

2. The flame retardant thermoplastic resin composition as defined in claim 1, wherein said oligomeric phosphoric acid ester compound derived from bisphenol-A ($d_1$) is about 10 to 95% by weight and said oligomeric phosphoric acid ester compound derived from resorcinol ($d_2$) is about 5 to 90% by weight.

3. The flame retardant thermoplastic resin composition as defined in claim 1, wherein said fluorinated polyolefin resin (E) has average particle size of about 0.05 to 1000 μm and density of about 1.2 to 2.3 g/cm³.

4. The flame retardant thermoplastic resin composition as defined in claim 1, further comprising 0 to 60 parts by weight of an additive selected from the group consisting of flame retardant aids, lubricants, releasing agents, nucleating agent, antistatic agents, stabilizers, impact modifiers, inorganic fillers, pigments and dyes.

5. A method of preparing a resin composition comprising mixing the resin composition as defined in claim 1, and extruding through an extruder to obtain in the form of pellets.

6. A molded article comprising the composition of claim 1.

7. The flame retardant thermoplastic resin composition as defined in claim 1, wherein each $R_1$ is unsubstituted phenyl or naphthalene.

8. The flame retardant thermoplastic resin composition as defined in claim 7, wherein each $R_1$ is unsubstituted phenyl.

9. The flame retardant thermoplastic resin composition as defined in claim 1, comprising a flame retardant consisting of a mixture of phosphoric acid esters ($d_1$) and ($d_2$).

10. The flame retardant thermoplastic resin composition as defined in claim 1, wherein said composition does not include a phosphazene compound.

11. A flame retardant thermoplastic resin composition consisting of:
(A) about 45 to 95 parts by weight of a thermoplastic polycarbonate resin;
(B) about 1 to 50 parts by weight of a rubber modified vinyl graft copolymer prepared by graft-polymerizing ($b_1$) about 5 to 95% by weight of a monomer mixture consisting of 40 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and 5 to 60% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture there of onto ($b_2$) about 5 to 95% by weight of a rubber polymer selected from the group consisting of butadiene rubber, acryl rubber, ethylene-propylene rubber, styrene-butadiene rubber, acrylonitrile-butadiene rubber, isoprene rubber, copolymer of ethylene-propylene-diene (EPDM), polyorganosiloxane-polyalkyl (meth) acrylate rubber complex and a mixture thereof;

(C) about 0 to 50 parts by weight of a vinyl copolymer prepared by copolymerizing ($c_1$) about 50 to 95% by weight of styrene, a-methylstyrene, halogen- or alkyl-substituted styrene, $C_{1-8}$ methacrylic acid alkyl ester, $C_{1-8}$ acrylic acid alkyl ester, or a mixture thereof and ($c_2$) about 5 to 50% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture thereof;

(D) about 1 to 30 parts by weight of a mixture of oligomeric phosphoric acid ester compounds consisting of ($d_1$) about 5 to 99% by weight of an oligomeric phosphoric acid ester compound derived from bisphenol-A represented by the following Formula (II) or a mixture thereof:

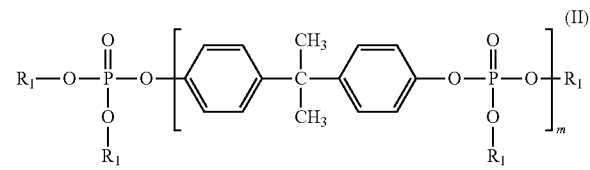

wherein each $R_1$ is unsubstituted $C_{6-20}$ aryl, m is an integer representing the number of repeating units of 1 to 5, and the average value of m in the mixture of the bisphenol A-derived oligomeric phosphoric acid ester is 1 to 3; and ($d_2$) about 1 to 95% by weight of an oligomeric phosphoric acid ester compound derived from resorcinol represented by the following Formula (III) or a mixture thereof, per 100 parts by weight of the sum of (A), (B) and (C):

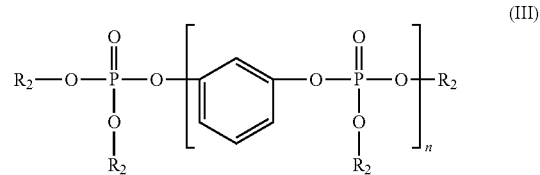

wherein $R_2$ is independently $C_{6-20}$ aryl group or an alkyl-substituted $C_{6-20}$ aryl group, n is an integer representing the number of repeating units of 1 to 5, and the average value of n in the mixture of the resorcinol-derived oligomeric phosphoric acid ester is 1 to 3;

(E) about 0.05 to 5 parts by weight of a fluorinated polyolefin resin, per 100 parts by weight of (A)+(B)+(C); and
0 to 60 parts by weight of an additive selected from the group consisting of flame retardant aids, lubricants, releasing agents, nucleating agent, antistatic agents, stabilizers, impact modifiers, inorganic fillers, pigments, dyes, and combinations thereof.

* * * * *